United States Patent [19]

Lashley

[11] Patent Number: 4,784,859

[45] Date of Patent: Nov. 15, 1988

[54] PROCESS FOR PRODUCING AN ALCOHOLIC SUGAR CANE JUICE BEVERAGE

[75] Inventor: David Lashley, Woodbrook, Trinidad and Tobago

[73] Assignee: William D. Ramjallacksingh, Trinidad and Tobago

[21] Appl. No.: 73,186

[22] Filed: Jul. 14, 1987

[51] Int. Cl.$^4$ ............................ C12G 1/00; C12G 3/00
[52] U.S. Cl. ........................................ 426/11; 426/15; 426/592; 426/51
[58] Field of Search ................... 426/7, 11, 15, 62, 48, 426/49, 51, 52

[56] References Cited

U.S. PATENT DOCUMENTS 3,093,548 6/1963 Coates et al. .................... 426/11
4,178,389 12/1979 Pilla .................................. 426/11

Primary Examiner—Marianne Cintins
Attorney, Agent, or Firm—Jay M. Cantor

[57] ABSTRACT

The disclosure relates to a method of making a cane juice beverage wherein cane juice is filtered and pasteurized and then fermented aerobically with agitation to provide a liquor an alcohol content of from about 11 to about 12% by weight. The fermented can juice is altered by the addition thereto of additional cane extract, flavorings and/or carbonation to obtain a Brix of 9 to 10 with an alcohol content in the range of 4 to 6% by weight. The liquid is clarified and then acidulated to a pH of 4.5 or less by the addition of acidic fruit juice and/or natural flavor extracts.

8 Claims, No Drawings

PROCESS FOR PRODUCING AN ALCOHOLIC SUGAR CANE JUICE BEVERAGE

BACKGROUND OF THE INVENTION

1. Field of the Invention

This invention relates to a cane juice beverage and, more specifically, to naturally sweetened and fermented cane juice beverage having an appreciable shelf life.

2. Brief Description of the Prior Art

Beverages which have the juice of sugar cane as a component thereof have been known in the prior art. One such prior art beverage is a sorghum wine which is discussed in the U.S. Pat. No. Myers 37,421 wherein a concentrated syrup of cane sugar is fermented, colored with carmelized sugar and aged under anaerobic conditions at two different temperatures to develop a characteristic flavor which is comparable to a Madeira wine. Other prior art which is exemplary, wherein cane sugar is used in the formation of a beverage other than as a sweetener per se are Coates (U.S. Pat. No. 3,093,548), Pilla (U.S. Pat. No. 4,178,389). These and other prior art cane sugar beverages have been plagued by short shelf life as well as having flavors which, to date, have not been well received by the public at large. It is the desire, especially in view of the large amount of sugar cane being produced, to provide a beverage which utilizes the cane sugar, which has a universally desirable flavor and which has a relatively long shelf life.

SUMMARY OF THE INVENTION

In accordance with the present invention, there is provided a beverage having a sugar cane juice base which fulfils the above noted requirements.

Briefly, sugar cane juice is expressed from the cane by crushing the cane and expressing the liquid sugar cane juice therefrom. This juice is then filtered to remove solids and then pasteurized at a temperature in the range of 90 degrees C. from 1 minute to 75 degrees C. for 5 minutes and preferably 85 degrees C. for three minutes. The preferred treatment time and temperature avoids problems of foaming or boil over and provides adequate lethality. The filtered cane juice is the innoculated with an alcohol tolerant yeast. A preferred such yeast is ATCC 9763. The innoculated cane juice is then fermented with agitation aerobically at from 19 to 35 degrees C. with a preferred temperature of 27 degrees C. for up to 6 days or until an alcohol content of from 11 to 12% by weight is measured.

After fermentation, a Brix in the range of 9 to 10 is obtained by the addition of further cane extract, flavoring and carbonation if necessary, this bringing the alcohol content down to a level of 4 to 6% by weight. The cane juice is then clarified by filtration and centrifugation, pasteurized in the range of 75 degrees C. for 5 minutes in a batch process of 85 degrees C. for 15 seconds in a high temperature, short time process to avoid flashing of too much alcohol. The cane juice is then mixed with pasteurized fruit juice to provide desired fruit flavor as well as fruit flavorings and/or other natural flavor extracts to obtain a pH of 4.5 or less. The acidic pH is obtained because the fruit flavorings and/or other natural flovor extracts available are generally acidic liquids which are used as both flavorings and acidulants. This final product is now at the proper pH to have relatively long shelf life and has been flavored with natural flavorings to provide a real fruit juice flavor. The final product is then packaged, preferably in glass bottles, though other types of containers can be used, such as, for example, plastic, steel or aluminum cans, PET bottles, etc., with carbonation to provide the final beverage. This beverage has natural fruit or other natural taste and relatively long shelf life.

DESCRIPTION OF THE PREFERRED EMBODIMENT

Sugar cane stalks were chopped up to lengths of about one foot and then placed in a crusher wherein the expressed cane liquid was caught in a container for later use. The liquid sugar cane juice was then filtered using a filter press or asymmetric ceramic microfilters to remove all sugar cane solids, such as fibers, stalk fragments etc., and the filtered juice was heated for three minutes to a temperature of 85 degrees C. The pasteurized juice was placed in a glass or stainless steel container and then innoculated with ATCC 9763 yeast in the amount of $1 \times 10^6$ to $1 \times 10^8$ cells per ml and was added at a rate of 0.5 to 1.0 ml per 400 ml of pasteurized juice. The innoculated liquor was then fermented in the container with agitation by continuous shaking at 200 to 250 revolutions per minute aerobically at 24 to 26 degrees C. for five to six days at which time the alcohol content was 11.5% by weight. Pasteurized cane juice was added to this fermented juice in a quantity to bring the alcohol content down to 5% by weight and provide a Brix of 9.5 degrees.

The juice was then clarified by filtration wherein loosely packed cotton wool was used to remove gross yeast cells not removed by prior centrifugation for up to 30 minutes at 6000 to 9000 rpm. A second filtration series of steps was then run in three steps using filter paper going in the first step from fast ashless to medium hardened in the second step and then to slow hardened and ashless in the third step. This removes solids responsible for dark color and yields a translucent yellow-brown liquid. The filtration steps can be assisted by pulling a vacuum of 500 to 6900 mm Hg to assist in attaining good flow rate. Alternatively, filtration may be carried out using a filter press with filter press pads of the quality mentioned above or by using an asymmetric ceramic microfilter system.

Centrifugation and then pasteurization were provided by heating to 85 degrees C. for 15 seconds on a HTST plate heat exchanger. The pasteurized juice was then mixed with pasteurized pineapple, sorrel, passion fruit and/or other juices/flavoring extracts in an amount to bring the pH down to 4.5. The juice was then placed in glass bottles while adding carbonation thereto to provide the final product.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variation and modification.

I claim:

1. A method of making an alcoholic sugar cane juice beverage, comprising the steps of:
   (a) providing filtered and pasteurized sugar cane juice;
   (b) inoculating the juice of step (a) with an alcohol fermentative yeast;

(c) fermenting the cane juice aerobically with agitation to provide an alcohol content of from about 11 to about 12% by weight;

(d) blending the fermented liquid to step (c) with pasteurized sugar cane juice to obtain a Brix of from about 9 to about 10 with an alcohol content in the range of from about 4 to about 6% by weight;

(e) clarifying and pasteurizing the liquid from step (d); and (f) acidulating the clarified liquid of step (e) with a material selected from the group consisting of natural pasteurized acidic fruit juice and natural flavor extract.

2. The method of claim 1 wherein the cane juice in step (a) is provided by pasteurization in the range of from 75 to 90 degrees C. for from 1 to 5 minutes.

3. The method of claim 1 wherein the step of blending further comprises addition of flavoring and carbonation.

4. The method of claim 2 wherein the step of blending further comprises addition of flavoring and carbonation.

5. The method of claim 1 wherein the step of acidulating is to a pH of 4.5 or less.

6. The method of claim 2 wherein the step of acidulating is to a pH of 4.5 or less.

7. The method of claim 3 wherein the step of acidulating is to a pH of 4.5 or less.

8. The method of claim 4 wherein the step of acidulating is to a pH of 4.5 or less.

* * * * *